United States Patent
Matsui (10) Patent No.: US 8,078,887 B2
(45) Date of Patent: Dec. 13, 2011

(54) POWER SUPPLY VOLTAGE REGULATOR CIRCUIT AND MICROCOMPUTER

(75) Inventor: Satoshi Matsui, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 624 days.

(21) Appl. No.: 12/043,506

(22) Filed: Mar. 6, 2008

(65) Prior Publication Data
US 2008/0222436 A1 Sep. 11, 2008

(30) Foreign Application Priority Data
Mar. 6, 2007 (JP) ................................. 2007-055092

(51) Int. Cl.
G06F 1/00 (2006.01)
G06F 1/26 (2006.01)
G06F 1/32 (2006.01)

(52) U.S. Cl. .................... 713/300; 713/320; 713/340

(58) Field of Classification Search ............. 713/300, 713/320, 340
See application file for complete search history.

(56) References Cited

U.S. PATENT DOCUMENTS

| 5,204,963 A | * | 4/1993 | Noya et al. ............. 365/229 |
| 5,734,618 A | | 3/1998 | Mizuta |
| 6,151,262 A | * | 11/2000 | Haroun et al. .......... 365/227 |

FOREIGN PATENT DOCUMENTS

| JP | 62-6315 | | 1/1987 |
| JP | 09-222939 | A | 8/1997 |
| JP | 2001-067337 | A | 3/2001 |
| JP | 2002-297260 | A | 10/2002 |
| JP | 2003-203006 | A | 7/2003 |
| JP | 2006-039623 | A | 2/2006 |
| JP | 2006-221381 | A | 8/2006 |

* cited by examiner

Primary Examiner — Mark Rinehart
Assistant Examiner — Jeremy S Cerullo
(74) Attorney, Agent, or Firm — Arent Fox LLP (57) ABSTRACT

A power supply voltage regulator circuit including a power supply circuit which switches to a first through a fourth state; the first state being the state wherein voltage is supplied to neither a normal circuit nor a backup system circuit based on the combination of logic for the normal circuit power control signal, the second state being the state wherein a primary power supply voltage is supplied to the normal circuit and a secondary power supply voltage is supplied to the backup system circuit, the third state being the state wherein voltage is not supplied to the normal circuit and the secondary power supply voltage is supplied to the backup system circuit, the fourth state being the state wherein the primary power supply voltage is supplied to both the normal circuit and the backup system circuit.

10 Claims, 8 Drawing Sheets

FIG. 3

| AE | BE | STATUS | $V_A$ | $V_B$ |
|---|---|---|---|---|
| 0 | 0 | STOP | 0V | 0V |
| 1 | 0 | OPERATION | 3.3V | 1.3V |
| 0 | 1 | BACKUP | 0V | 1.3V |
| 1 | 1 | NORMAL | 3.3V | 3.3V |

| AE | BE | CE | STATUS | $V_A$ | $V_B$ |
|----|----|----|--------|-------|-------|
| 0  | 0  | —  | STOP   | 0V    | 0V    |
| 1  | 0  | 0  | RUN    | 3.3V  | 1.3V  |
| 1  | 0  | 1  | RUN    | 3.3V  | 3.3V  |
| 0  | 1  | —  | BACKUP | 0V    | 1.3V  |
| 1  | 1  | —  | NORMAL | 3.3V  | 3.3V  |

POWER SUPPLY VOLTAGE REGULATOR CIRCUIT AND MICROCOMPUTER

CROSS-REFERENCE TO RELATED APPLICATIONS

This application is based upon and claims the benefit of priority from the prior Japanese Patent Application No. 2007-55092 filed on Mar. 6, 2007, the entire contents of which are incorporated herein by reference.

BACKGROUND OF THE INVENTION

1. Field of the Invention

The present invention relates to a power supply voltage regulator circuit for supplying power supply voltage to a normal circuit and backup system circuit, and a microcomputer.

2. Description of Related Art

Recently, in order to reduce power consumption and improve battery lifetime, some mobile devices e.g. digital video cameras are being made so that no power is supplied to the microcomputers embedded therein when in a state (a standby state) in which CPU operation is not necessary. However, even when in the standby state, power must be provided to the microcomputer's clock function and to memory such as backup RAM. Therefore, power is separated between CPU side normal circuit power and backup system circuit power so that when in the standby state, the supply of power to the normal circuit is stopped and power is supplied to the backup circuit.

In Japanese Laid-Open Unexamined Patent Application Publication No. S62-6315, a memory backup apparatus for microcomputers was set forth. For example, the microcomputer memory backup apparatus has a microcomputer that can back up memory at low power consumption, a reset circuit for sending reset signals when voltage is below a certain reference voltage, a backup power circuit for switching the power supply of the microcomputer to microcomputer backup power (such as lithium batteries) when voltage is below a certain reference voltage, and a power detection circuit for detecting whether or not there is power. Furthermore, the microcomputer is configured such that after a reset signal is detected from the reset circuit, the operation mode or low power consumption mode (standby mode) is executed by a signal from the power detection circuit.

SUMMARY

According to one aspect of the present invention, the power supply voltage regulator circuit is a power supply voltage regulator circuit that supplies a primary power supply voltage or a secondary power supply voltage, which is lower than the primary, to a normal circuit and a backup system circuit, both of which have separate power supplies. The power supply voltage regulator circuit also has a power supply circuit that switches to a state between a first, a second, a third, and a fourth state.

In the first state, based on the combination of logic for a normal circuit power control signal for controlling power to the normal circuit and a backup circuit power control signal for controlling power to the backup system circuit, voltage is supplied to neither the normal circuit nor the backup system circuit.

In the second state, the primary power supply voltage is supplied to the normal circuit and the secondary power supply voltage is supplied to the backup system circuit.

In the third state, voltage is not supplied to the normal circuit and the secondary power supply voltage is supplied to the backup system circuit.

In the fourth state, the primary power supply voltage is supplied to both the normal circuit and the backup system circuit.

According to another aspect of the present invention, a microcomputer has
a normal circuit comprising a CPU,
a backup system circuit having a separate power supply from the normal circuit, and
a power supply circuit for switching to a first state wherein, based on the combination of logic for a normal circuit power control signal for controlling power to the normal circuit and a backup circuit power control signal for controlling power to the backup system circuit, voltage is supplied to neither the normal circuit nor the backup system circuit; to a second state wherein the primary power supply voltage is supplied to the normal circuit and the secondary power supply voltage, which is lower than the primary power supply voltage, is supplied to the backup system circuit; to a third state wherein voltage is not supplied to the normal circuit and the secondary power supply voltage is supplied to the backup system circuit; and to a fourth state wherein the primary power supply voltage is supplied to both the normal circuit and the backup system circuit.

Additional advantages and novel features of aspects of the present invention will be set forth in part in the description that follows, and in part will become more apparent to those skilled in the art upon examination of the following or upon learning by practice thereof.

DESCRIPTION OF THE PREFERRED EMBODIMENTS

Hereinafter, the attached drawings are used to explain the embodiments in detail.

Note, in the following explanation, the same symbol is given to similar configurations to omit duplicate explanations.

Embodiment 1

Figure 1:
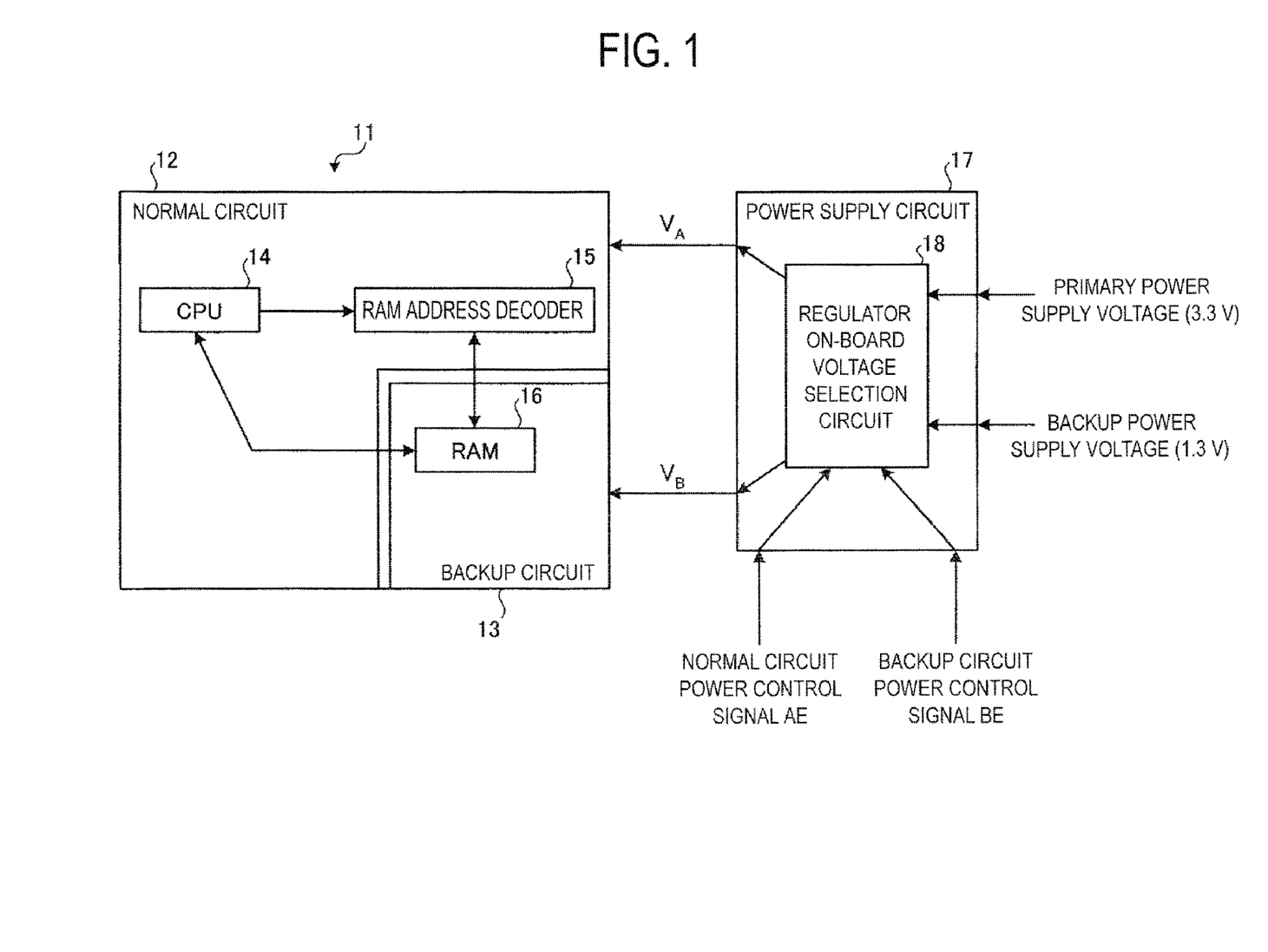
FIG. 1 shows a power supply voltage regulator circuit and microcomputer configuration according to Embodiment 1.

FIG. 1 shows a power supply voltage regulator circuit and microcomputer configuration according to Embodiment 1.

As shown in FIG. 1, a microcomputer 11 has a normal circuit 12 and a backup circuit 13 with separate power sources. The normal circuit 12 has a CPU 14 and a RAM address decoder 15. Also, the backup circuit 13 has RAM memory 16 as its backup memory.

A power supply circuit 17 switches between the primary power supply voltage and the backup power supply voltage, providing power supply voltage to the normal circuit 12 and the backup circuit 13, accordingly. The power supply circuit 17 comprises a regulator on-board voltage selection circuit (hereinafter "voltage selection circuit") 18. The voltage selection circuit 18 selects the power supply voltage to be supplied to the normal circuit 12 and the backup circuit 13 based on a normal circuit power control signal AE and a backup circuit power control signal BE.

The primary power supply voltage here is the voltage at which data can be read from or written to RAM memory 16, e.g. 3.3 V. On the other hand, the backup power supply voltage cannot be used for reading or writing data to/from RAM memory 16, but is instead a voltage at which data can be retained in RAM memory 16, e.g. 1.3 V.

Normal circuit power control signal AE is a signal indicating the power source status during normal operation, and backup circuit power control signal BE is a signal indicating operation by a backup power source. For example, if the microcomputer 11 is embedded into a digital video camera, normal circuit power control signal AE indicates that the camera's main switch is "on". Consequently, in this case, the main switch signal can be used as normal circuit power control signal AE in its current state. Also, backup circuit power control signal BE indicates that the high-capacity battery, the primary power source, is removed from the camera. Consequently, when backup circuit power control signal BE becomes active, the microcomputer switches to a state in which the clock function operates or a state in which RAM memory 16 stores data using a small button-type battery.

Figure 2:
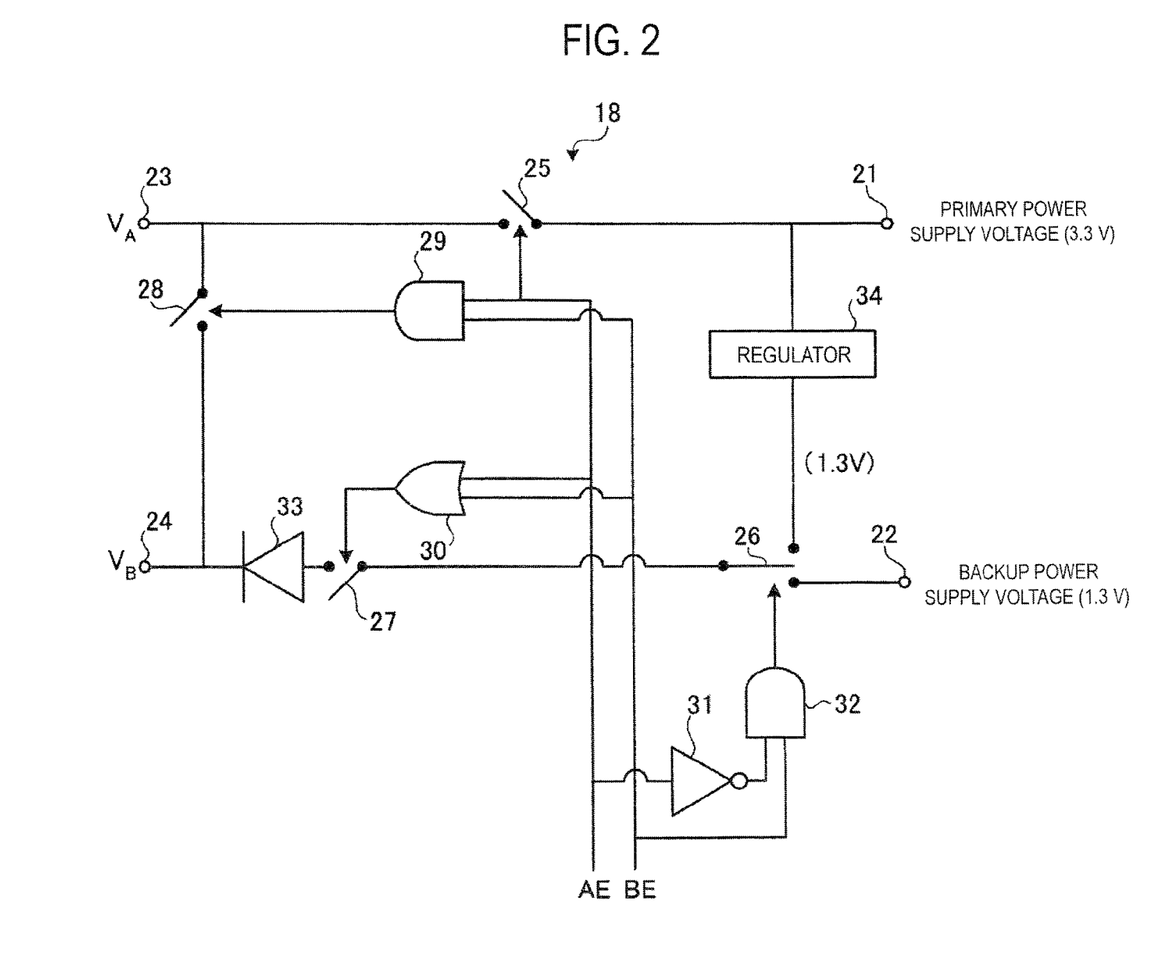
FIG. 2 shows the configuration of a voltage selection circuit in the power supply voltage regulator circuit according to Embodiment 1.

FIG. 2 shows the configuration of the voltage selection circuit in the power supply voltage regulator circuit according to Embodiment 1. As shown in FIG. 2, a first switch 25 is connected between a primary power supply voltage input pin 21 and a normal circuit supply voltage output pin 23 of the voltage selection circuit 18. A second switch 26 is connected between a backup power supply voltage input pin 22 and a backup circuit supply voltage output pin 24. A third switch 27 is connected between the second switch 26 and the backup circuit supply voltage output pin 24. A fourth switch 28 is connected between the normal circuit supply voltage output pin 23 and the backup circuit supply voltage output pin 24. A diode 33 for backflow prevention is inserted between the third switch 27 and the backup circuit supply voltage output pin 24.

A regulator 34 is connected between the primary power supply voltage input pin 21 and the backup power supply voltage input pin 22. This regulator 34 outputs the same voltage as the backup power supply voltage (e.g. 1.3 V) when stepping the primary power supply voltage down. However, either the output voltage of the regulator 34 or the backup power supply voltage which was input to the backup power supply voltage input pin 22 is selected by the second switch 26. Also, this is not shown in the diagram, but the regulator 34 outputs each voltage, which is required, by each part of the microcomputer 11.

The first switch 25 is controlled by normal circuit power control signal AE. For example, the first switch 25 closes when normal circuit power control signal AE is "1", and opens when the control signal AE is "0". The second switch 26 is controlled by the output signal of an AND gate 32, which uses as its inputs the signal resulting when normal circuit power control signal AE is inverted by an inverter 31 and backup circuit power control signal BE. For example, the second switch 26 selects the backup power supply voltage input pin 22 side when the output signal of the AND gate 32 is "1", and selects the regulator 34 side when the output signal is "0".

The third switch 27 is controlled by the output signal of an OR gate 30 which uses as its inputs normal circuit power control signal AE and backup circuit power control signal BE. For example, the third switch 27 closes when the output signal of the OR gate 30 is "1", and opens when the output signal is "0". The fourth switch 28 is controlled by an output signal of an AND gate 29 which uses as its inputs normal circuit power control signal AE and backup circuit power control signal BE. For example, the fourth switch 28 closes when the output signal of the AND gate 29 is "1", and opens when the output signal is "0".

Figure 3:
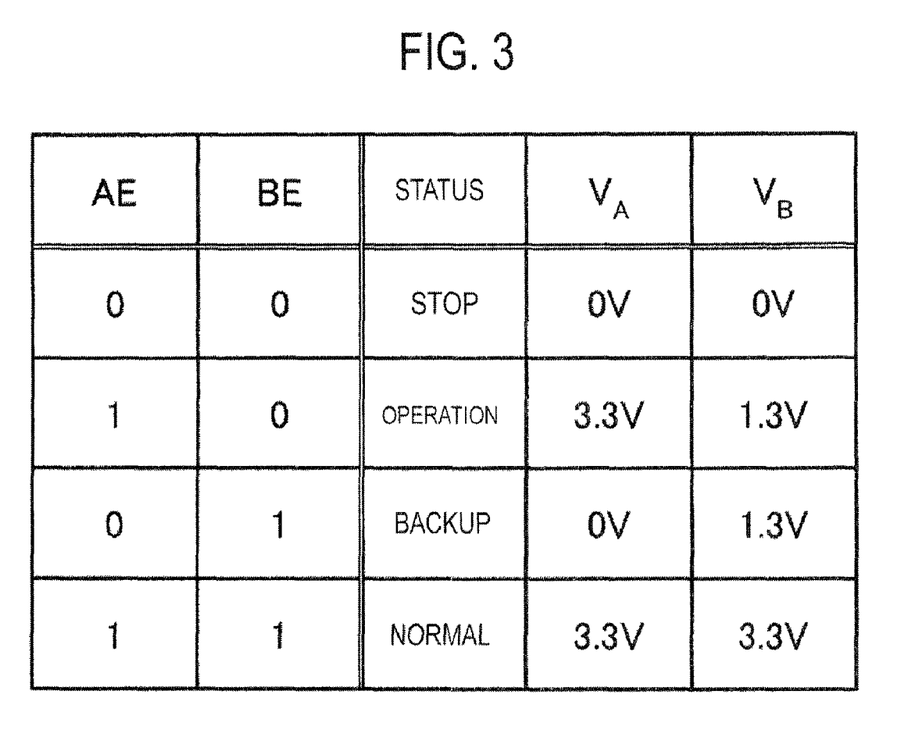
FIG. 3 is a table explaining the operation of the voltage selection circuit shown in FIG. 2.

FIG. 3 is a table explaining the operation of the voltage selection circuit shown in FIG. 2. As shown in FIG. 3, the first switch 25 and the third switch 27 open when both normal circuit power control signal AE and backup circuit power control signal BE are "0", so voltage VA of the normal circuit supply voltage output pin 23 and voltage VB of the backup circuit supply voltage output pin 24 are both 0 V. At this time the microcomputer 11 is in a stop state, so both the CPU 14 and the RAM memory 16 have stopped.

The first switch 25 closes when normal circuit power control signal AE is "1" and backup circuit power control signal BE is "0", so voltage VA of the normal circuit supply voltage output pin 23 is the primary power supply voltage (e.g. 3.3 V). Also, the second switch 26 selects the regulator 34 side, the third switch 27 closes, and the fourth switch 28 opens, so voltage VB of the backup circuit supply voltage output pin 24 is the output voltage (e.g. 1.3 V) of the regulator 34. At this time, the microcomputer 11 is in a run state, the CPU 14 runs, and RAM memory 16 retains data. Primary power supply voltage is supplied to the primary power supply voltage input pin 21 by a large-capacity battery such as a lithium ion battery.

The first switch 25 opens when normal circuit power control signal AE is "0", and backup circuit power control signal BE is "1", so voltage VA of the normal circuit supply voltage output pin 23 is 0V. Also, the second switch 26 selects the backup power supply voltage input pin 22, the third switch 27 closes, and the fourth switch 28 opens, so voltage VB of the backup circuit supply voltage output pin 24 is the backup power supply voltage (e.g. 1.3 V). At this time, the microcomputer 11 is in a backup state, the CPU 14 has stopped, and RAM memory 16 retains data. Backup power supply voltage is supplied to the backup power supply voltage input pin 22 by a button-type battery, for example.

The first switch 25 closes when normal circuit power control signal AE and backup circuit power control signal BE are both "1", so voltage VA of the normal circuit supply voltage output pin 23 is the primary power supply voltage (e.g. 3.3 V). Also, the second switch 26 selects the regulator 34 side, and the third switch 27 and fourth switch 28 close, but because of the diode 33 for backflow prevention, voltage VB of the backup circuit supply voltage output pin 24 is the primary power supply voltage (e.g. 3.3 V). At this time the microcomputer 11 is in a normal operation state, so both the CPU 14 and RAM memory 16 operate.

Embodiment 2

Figure 4:
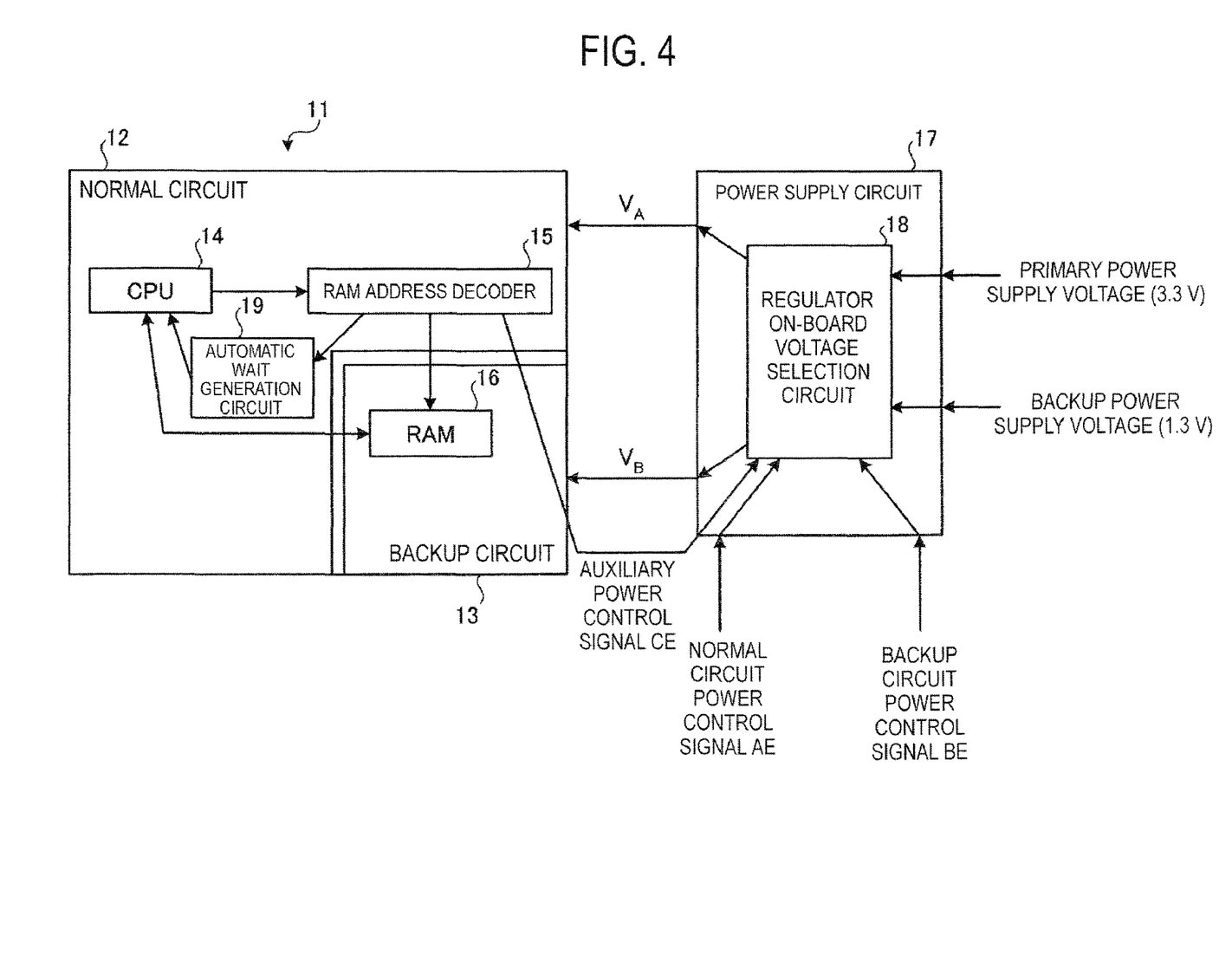
FIG. 4 shows a power supply voltage regulator circuit and microcomputer configuration according to Embodiment 2.

FIG. 4 shows a power supply voltage regulator circuit and microcomputer configuration according to Embodiment 2.

As shown in FIG. 4, Embodiment 2 differs from Embodiment 1 in that the automatic wait generation circuit 19 is provided in the normal circuit 12 of the microcomputer 11 in Embodiment 1. In addition, the voltage selection circuit 18 switches the voltage depending on the combination of logic among normal circuit power control signal AE, backup circuit power control signal BE, and auxiliary power control signal CE. Auxiliary power control signal CE is a signal that becomes active when a RAM access signal is issued from the CPU 14, e.g. when the RAM access signal is output from the RAM address decoder 15.

Figure 5:
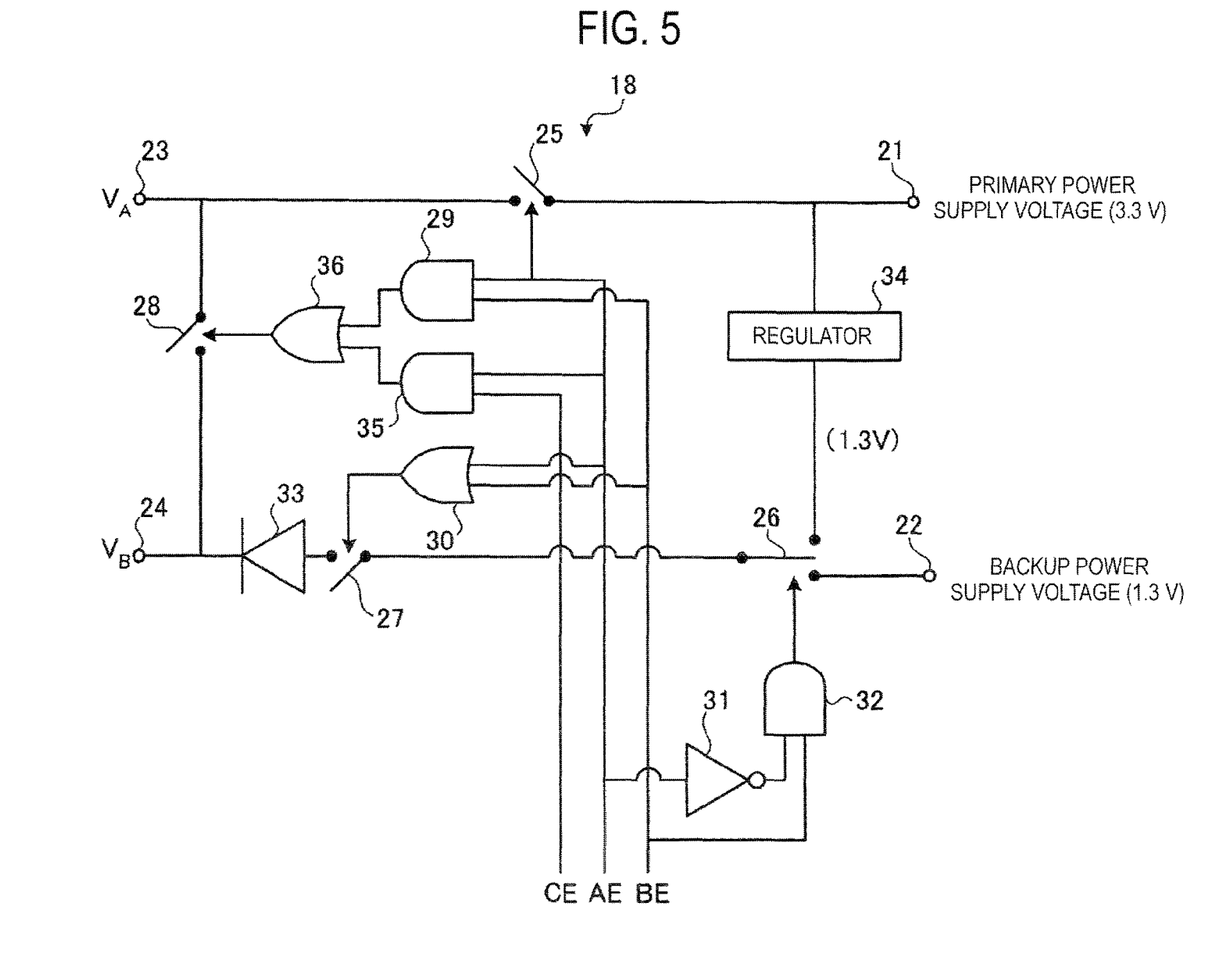
FIG. 5 shows the configuration of a voltage selection circuit in the power supply voltage regulator circuit according to Embodiment 2.

FIG. 5 shows the configuration of the voltage selection circuit in the power supply voltage regulator circuit according to Embodiment 2. As shown in FIG. 5, in Embodiment 2, the AND gate 35 and OR gate 36 are provided to the voltage selection circuit 18 in addition to the configuration explained in Embodiment 1. The AND gate 35 uses as its inputs normal circuit power control signal AE and auxiliary power control signal CE. The OR gate 36 uses as its inputs the output signal of the AND gate 29, which in turn uses as its inputs normal circuit power control signal AE and backup circuit power control signal BE, and the output signal of the AND gate 35, which was added on. The fourth switch 28 is controlled by the output signal of this OR gate 36, which was added on.

Figure 6:
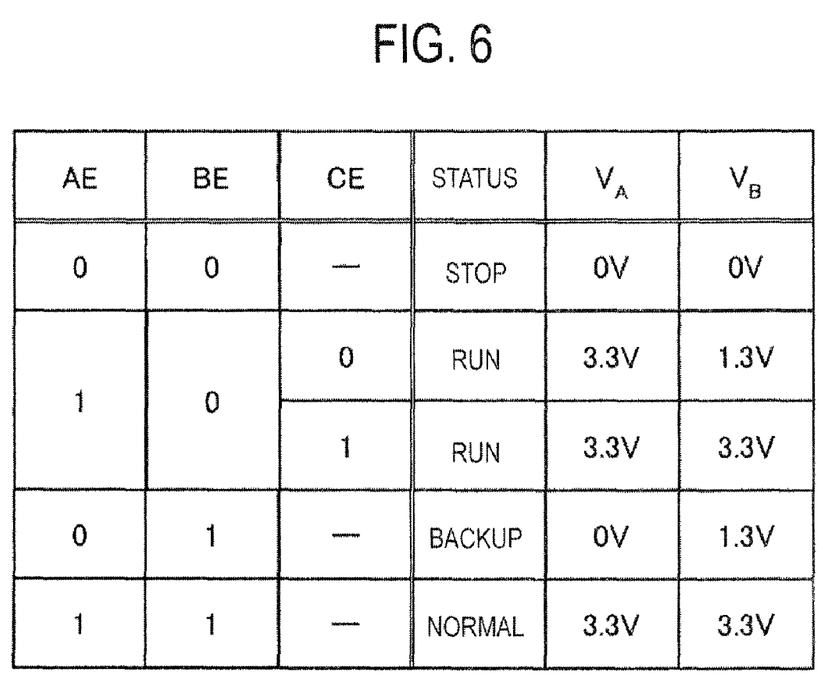
FIG. 6 is a table explaining the operation of the voltage selection circuit shown in FIG. 5.

FIG. 6 is a table explaining the operation of the voltage selection circuit shown in FIG. 5. As shown in FIG. 6, normal circuit power control signal AE is "0" when both normal circuit power control signal AE and backup circuit power control signal CE are "0" (stop state). Then, when backup circuit power control signal BE is "1" (backup state) and normal circuit power control signal AE and backup circuit power control signal BE are both "1" (normal state), the state is the same as that explained in Embodiment 1 regardless of auxiliary power control signal CE.

Normal circuit power control signal AE is "1", and backup circuit power control signal BE is "0". The first switch 25 closes when auxiliary power control signal CE is "0", so voltage VA of the normal circuit supply voltage output pin 23 is the primary power supply voltage (e.g. 3.3 V). Also, the second switch 26 selects the regulator 34 side, the third switch 27 closes, and the fourth switch 28 closes. Consequently, voltage VB of backup circuit supply voltage output pin 24 is the output voltage (e.g. 1.3 V) of the regulator 34. The microcomputer 11 at this time is in a run state, but the microcomputer 11 is in a state where there has been no access to RAM memory 16 of the backup circuit 13.

If there has been access to RAM memory 16 of the backup circuit 13 when normal circuit power control signal AE is "1" and backup circuit power control signal BE is "0", auxiliary power control signal CE becomes "1". Then, the output signal of the AND gate 35, which uses as its inputs normal circuit power control signal AE and auxiliary power control signal CE, transitions from "0" to "1", and the output signal of the OR gate 36, which uses this output signal as its input, also transitions from "0" to "1". Thereby, the fourth switch 28 closes and voltage VB of the backup circuit supply voltage output pin 24 is the primary power voltage (e.g. 3.3 V), because the backflow prevention diode 33 exists.

Therefore, the voltage at which data can be written to or read from RAM memory 16 in the microcomputer 11 is supplied, thereby making access to RAM memory 16 possible. In other words, the microcomputer 11 at this time is in a run state, and is in a state where there has been access to RAM memory 16 of the backup circuit 13. When access to RAM memory 16 ends, auxiliary power control signal CE resets to "0", so voltage VB of the backup circuit supply voltage output pin 24 returns to the output voltage (e.g. 1.3 V) of the regulator 34.

Figure 7:
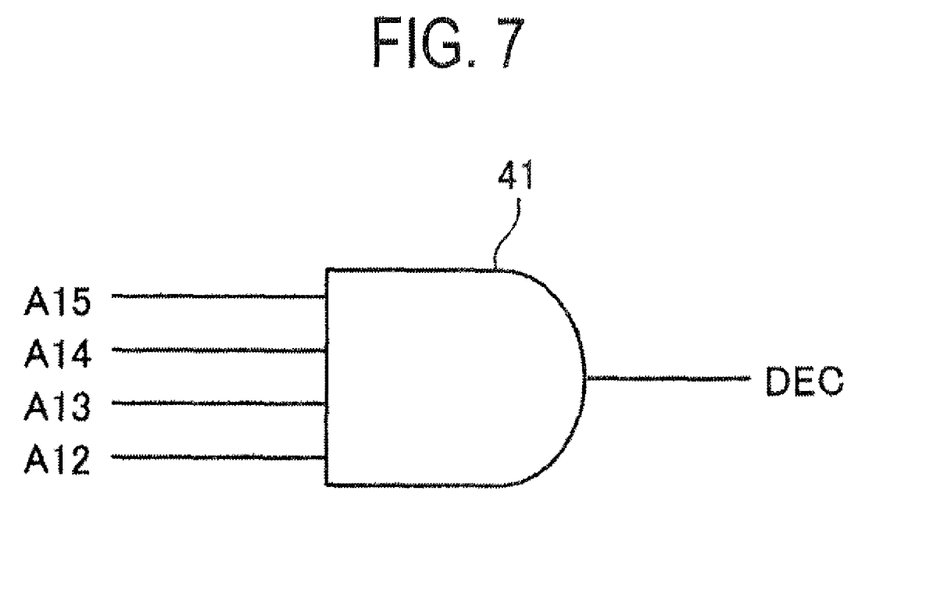
FIG. 7 shows the configuration of an auxiliary power source control signal generation circuit in the RAM address decoder.

FIG. 7 shows a configuration of the auxiliary power source control signal generation circuit in the RAM address decoder. At this point, the address of RAM memory 16 in a 16-bit address space shall be from 0xF000 to 0xFFFF. In this case, as shown in FIG. 7, the auxiliary power source control signal generation circuit comprises the AND gate 41, which uses as its inputs address signals A15, A14, A13, and A12 which are the upper 4 bits. Decoding signal DEC, which is output from this AND gate 41, is passed off to the voltage selection circuit 18 as auxiliary power control signal CE. Also, decoding signal DEC is passed off to the automatic wait generation circuit 19 as the RAM address access signal. Decoding signal DEC is output at the timing when the write signal or read signal are combined with a timing or other such signal and RAM memory 16 is accessed.

Note, the portion of the conventional address decoder circuits used in the RAM address decoder 15 which decodes address signals A15, A14, A13, and A12, which are the upper 4 bits, then generates a chip enable signal can also be used as the auxiliary power source control signal generation circuit. In addition, providing the AND gate 41 as the auxiliary power source control signal generation circuit is acceptable. Also, if there is an area in RAM memory 16 that cannot read or write data at low voltage (e.g. 1.3 V) and an area that can read or write data, configuring the auxiliary power source control signal generation circuit to output the decoding signal DEC when accessing the area which cannot read or write data at low voltage (e.g. 1.3 V) is acceptable.

Figure 8:
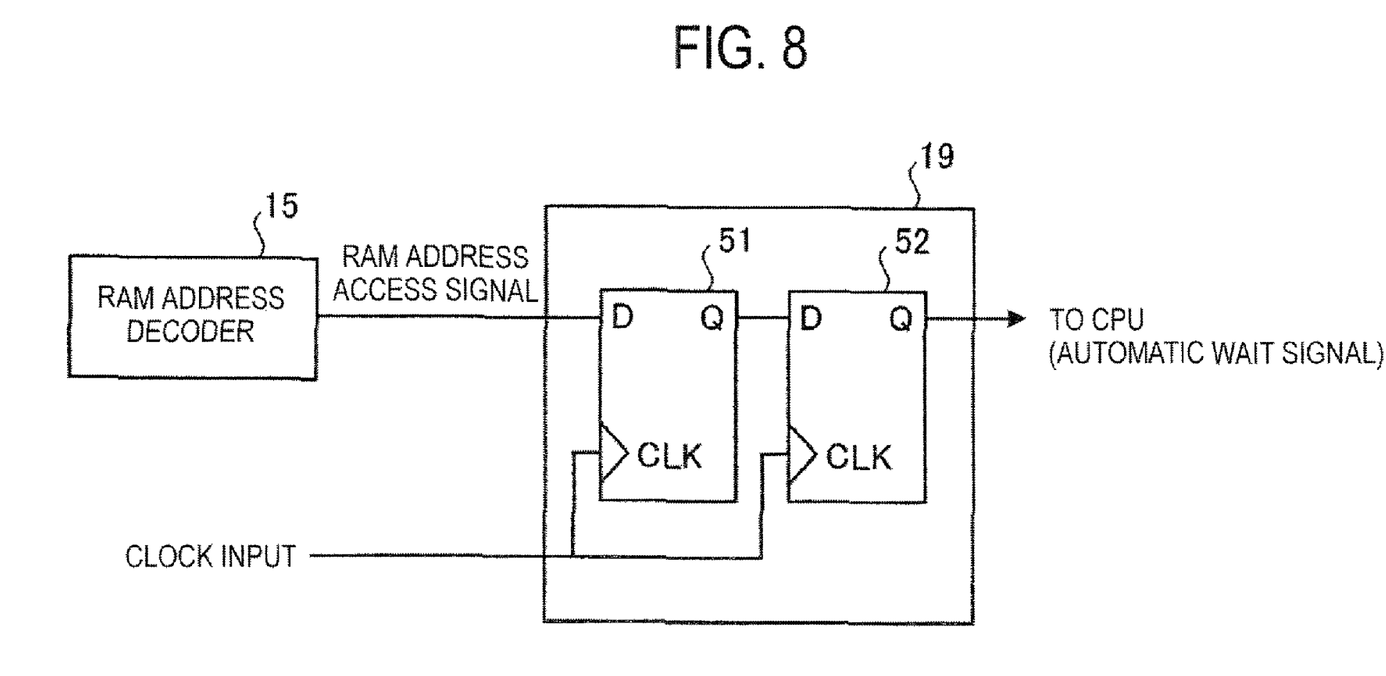
FIG. 8 shows the configuration of an automatic wait generation circuit.

FIG. 8 shows the configuration of an automatic wait generation circuit. As shown in FIG. 8, the automatic wait generation circuit 19, without any particular limit on the number of stages therein, comprises two flip-flop stages 51 and 52. When the RAM address access signal from the RAM address decoder 15 becomes active, the automatic wait generation circuit 19 uses flip-flops 51 and 52 to generate a signal that becomes active for a predetermined period of time then output the signal to the CPU 14 as an automatic wait signal. The time the CPU 14 accesses RAM memory 16 is thereby extended, allowing the supply voltage to RAM memory 16 to stabilize. The number of flip-flop stages is selected in accordance with the time required for the supply voltage to RAM memory 16 to stabilize.

As described above, according to Embodiment 1, low power supply voltage is supplied to the backup circuit 13 except when RAM memory 16 of the backup circuit 13 is being accessed. Also, the power supply voltage supplied to the normal circuit 12 and the backup circuit 13 is determined by the combination of logic for normal circuit power control signal AE and backup circuit power control signal BE, and is automatically switched. Consequently, high voltage can be supplied to the backup circuit 13 only when necessary, in order to reduce the power consumption of the microcomputer 11.

Also, according to Embodiment 2, the power supply voltage of the backup circuit 13 is controlled by auxiliary power control signal CE, and the automatic wait generation circuit 19 extends the access time to RAM memory 16. In addition, when RAM memory 16 is in a standby state, the CPU 14 can access RAM memory 16 without any waiting time. The power supply voltage regulator circuit and microcomputer is not limited to the above-mentioned aspects and a variety of modifications thereof are possible. In embodiment 2 for example, when the microcomputer 11 is in a run state and transitions from a state in which RAM memory 16 has not been accessed into a state in which RAM memory 16 has been accessed, it is also acceptable for the microcomputer 11 to control the regulator 34 of the voltage selection circuit 18 and change the output voltage of the regulator 34 from a low voltage to a high voltage. Also, the automatic wait generation circuit 19 is not limited to comprising flip-flops.

Example embodiments of aspects of the present invention have now been described in accordance with the above advantages. It will be appreciated that these examples are merely illustrative of aspects of the present invention. Many variations and modifications will be apparent to those skilled in the art.

What is claimed is:

1. A power supply voltage regulator circuit for supplying a primary power supply voltage or a secondary power supply voltage, which is lower than the primary power supply voltage, to a normal circuit and a backup system circuit having separate power supplies, the power supply voltage regulator circuit comprising:
   a power supply circuit that switches to a first, a second, a third, and a fourth state, and the switching is based on a combination of logic for a normal circuit power control signal for controlling power supplied to the normal circuit and a backup circuit power control signal for controlling power supplied to the backup system circuit;
   wherein in the first state when the normal circuit power control signal and the backup circuit power control signal are inactive, voltage is supplied to neither the normal circuit nor the backup system circuit,
   wherein in the second state when the normal circuit power control signal is active and the backup circuit power control signal is inactive, the primary power supply voltage is supplied to the normal circuit and the secondary power supply voltage is supplied to the backup system circuit,
   wherein in the third state when the normal circuit power control signal is inactive and the backup circuit power control signal is active, voltage is not supplied to the normal circuit and the secondary power supply voltage is supplied to the backup system circuit, and
   wherein in the fourth state when the normal circuit power control signal and the backup circuit power control signal are active, the primary power supply voltage is supplied to both the normal circuit and the backup system circuit.

2. The power supply voltage regulator circuit according to claim 1, wherein
   the back up system circuit includes memory, and
   the power supply circuit supplies the primary power supply voltage to the backup system circuit if the memory of the backup system circuit is accessed when in the second state.

3. The power supply voltage regulator circuit according to claim 2, wherein
   the power supply circuit supplies the secondary power supply voltage to the backup system circuit after access to the memory in the second state ends.

4. The power supply voltage regulator circuit according to claim 2, wherein
   the power supply circuit switches the supply voltage to the backup system circuit based on an address in the memory, which is in the second state, during access to the memory and when access to the memory ends.

5. The power supply voltage regulator circuit according to claim 2, wherein
   the normal circuit includes a CPU, and
   a wait time is inserted when the CPU of the normal circuit accesses the memory during access to the memory, which is in the second state.

6. A microcomputer comprising:
   a normal circuit, the normal circuit including a CPU;
   a backup system circuit having a separate power supply from the normal circuit; and
   a power supply circuit for switching to a first, a second, a third, and a fourth state, and the switching is based on a combination of logic for a normal circuit power control signal for controlling power supplied to the normal circuit and a backup circuit power control signal for controlling power supplied to the backup system circuit,
   wherein in the first state when the normal circuit power control signal and the backup circuit power control signal are inactive, voltage is supplied to neither the normal circuit nor the backup system circuit,
   wherein in the second state when the normal circuit power control signal is active and the backup circuit power control signal is inactive, the primary power supply voltage is supplied to the normal circuit and the secondary power supply voltage is supplied to the backup system circuit,
   wherein in the third state when the normal circuit power control signal is inactive and the backup circuit power control signal is active, voltage is not supplied to the normal circuit and the secondary power supply voltage is supplied to the backup system circuit, and
   wherein in the fourth state when the normal circuit power control signal and the backup circuit power control signal are active, the primary power supply voltage is supplied to both the normal circuit and the backup system circuit.

7. The microcomputer according to claim 6, wherein
   the backup system circuit includes memory, and
   the power supply circuit supplies the primary power supply voltage to the backup system circuit, if the memory of the backup system circuit was accessed while in the second state.

8. The microcomputer according to claim 7, wherein
   the power supply circuit supplies the secondary power supply voltage to the backup system circuit after access to the memory, which is in the second state, ends.

9. The microcomputer according to claim 7, wherein
   the power supply circuit switches the supply voltage to the backup system circuit based on an address to the memory when the memory, which is in the second state, is accessed or when the access ends.

10. The microcomputer according to claim 7, further comprising:
   a wait generation circuit for inserting a wait time when the CPU of the normal circuit accesses the memory during access to the memory, which is in the second state.

* * * * *